United States Patent
Balan et al.

(10) Patent No.: US 8,312,243 B2
(45) Date of Patent: Nov. 13, 2012

(54) MEMORY MANAGEMENT IN NETWORK PROCESSORS

(75) Inventors: Shreeharsha Balan, Bangalore (IN);
Naveed Alam, Bangalore (IN); Joby Abraham, Bangalore (IN)

(73) Assignee: Lantiq Deutschland GmbH, Neubiberg (DE)

( * ) Notice: Subject to any disclaimer, the term of this patent is extended or adjusted under 35 U.S.C. 154(b) by 525 days.

(21) Appl. No.: 12/504,477

(22) Filed: Jul. 16, 2009

(65) Prior Publication Data

US 2011/0016284 A1     Jan. 20, 2011

(51) Int. Cl.
*G06F 12/00* (2006.01)
(52) U.S. Cl. .......... 711/170; 710/52; 711/171; 711/173; 711/202
(58) Field of Classification Search ................ 711/170, 711/202, 171, 173; 710/52
See application file for complete search history.

(56) References Cited

U.S. PATENT DOCUMENTS

| | | | |
|---|---|---|---|
| 6,044,361 A * | 3/2000 | Kalagnanam et al. ........ 705/28 |
| 6,694,388 B1 * | 2/2004 | Schzukin et al. ............ 710/52 |
| 7,046,686 B1 | 5/2006 | Tompkins et al. |
| 7,406,080 B2 | 7/2008 | Basso et al. |
| 7,849,502 B1 * | 12/2010 | Bloch et al. ................. 726/11 |
| 2005/0060509 A1 * | 3/2005 | Loafman .................... 711/170 |
| 2006/0271502 A1 * | 11/2006 | Yajima ...................... 707/2 |
| 2008/0183907 A1 | 7/2008 | Thudt |
| 2009/0300320 A1 * | 12/2009 | Zhang ....................... 711/213 |

OTHER PUBLICATIONS

"Slab allocation," Wikipedia, free encyclopedia, 3 pages, dowloaded from Wikipedia.com Aug. 10, 2009.

* cited by examiner

*Primary Examiner* — Jae Yu
(74) *Attorney, Agent, or Firm* — Slater & Matsil, L.L.P.

(57) ABSTRACT

System and method for storing information units is provided. The system includes a memory comprising a plurality of contiguous memory segments, a local memory storing a plurality of pointers, each pointer pointing to one contiguous memory segment, a receiving unit configured to arrange incoming information units into queues and memory control logic configured to allocate pointers to the queues and configured to cause the incoming information units to be written into contiguous memory segments. The incoming information units form at least one queue and wherein pointers form a linked list of pointers if the information units are written into more than one contiguous memory segment.

6 Claims, 9 Drawing Sheets

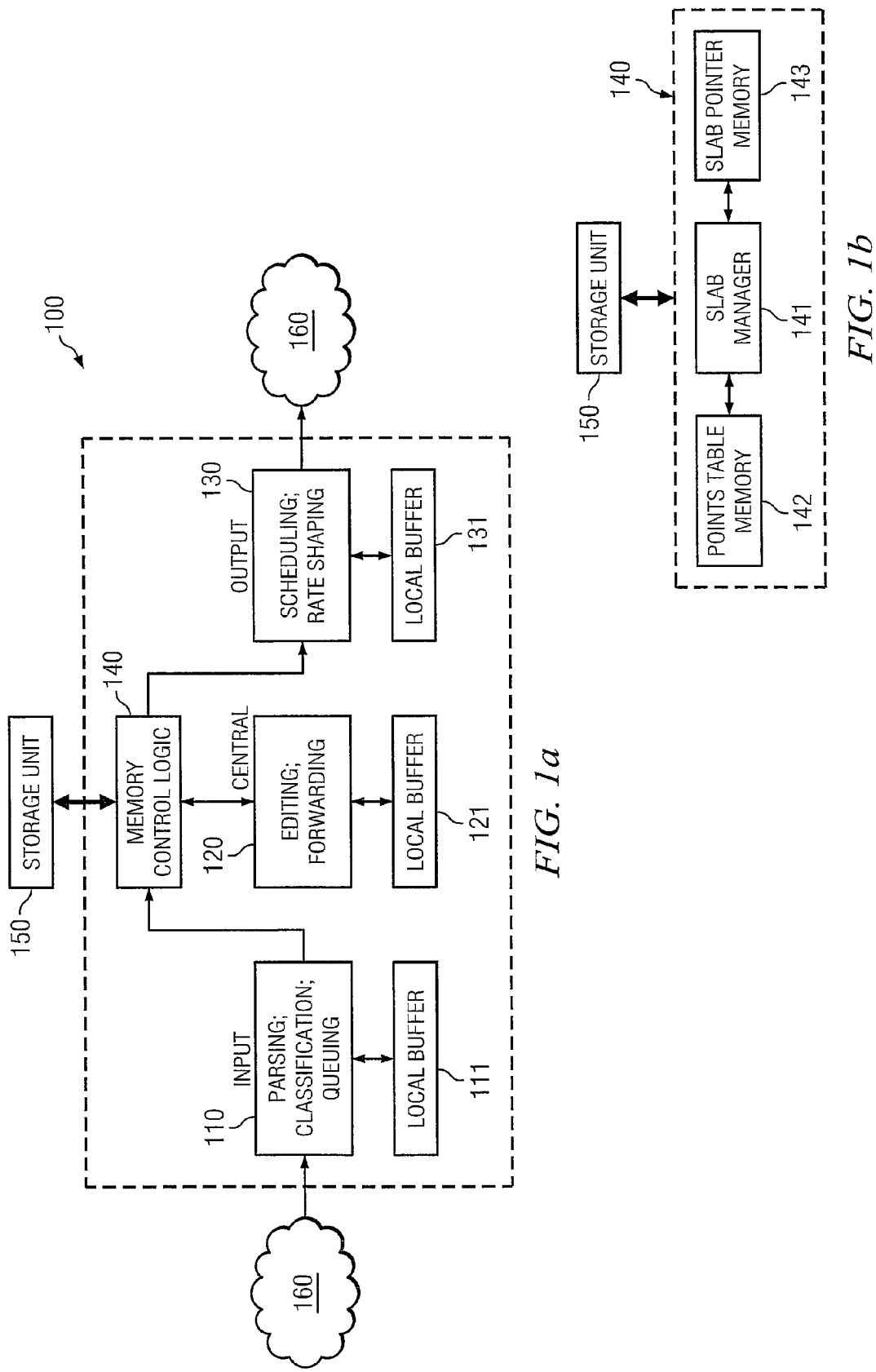

US 8,312,243 B2

MEMORY MANAGEMENT IN NETWORK PROCESSORS

TECHNICAL FIELD

The present invention relates generally to data processing systems and, in a particular embodiment, to memory management in network processors.

BACKGROUND

In today's world users rely on computer or telecommunication networks to communicate with each other and/or to share resources. These networks are often built of hundreds or thousands of network devices, such as routers, switches, access control devices and the like. In modern computer or telecommunication networks, information (e.g., voice, video, data) is transferred as packet data. The processing of these packets has resulted in the creation of optimized network devices to deal with this form of data. Network processors have specific features or architectures that are provided to enhance and optimize packet processing within these networks.

In their different applications, network processors provide only limited space for storing data since large on-chip buffer space is expensive. However, external storage devices provide such cost efficient storage space. A key performance factor of a network processor is how efficiently the processor handles the data storage and retrieval mechanism from and to this external storage space.

Currently, there are many different applications available in this field. For example, the memory management of a network processor may allocate a fixed size memory space to each queue. The memory array of the external storage space is operated as circular buffer. The disadvantage in this application is, however, that it is expected that the queue length will never grow beyond a predetermined size.

In another application, the memory management of a network processor allocates segments as and when required from a list of pointers stored in the local memory. A linked list of these segments makes a protocol data unit and further a linked list of protocol data units makes a queue. This application has the advantage of using the available memory space efficiently. However, this application requires a large number of pointers to be used and this in turn requires a large local memory.

SUMMARY OF THE INVENTION

These and other problems are generally solved or circumvented, and technical advantages are generally achieved, by preferred embodiments of the present invention which provide a novel memory management system and a method thereof.

In accordance with one embodiment of the present invention, a system for storing information units is provided. The system includes a memory comprising a plurality of contiguous memory segments, a local memory storing a plurality of pointers, each pointer pointing to one contiguous memory segment, a receiving unit configured to arrange incoming information units into queues and memory control logic configured to allocate pointers to the queues and configured to cause the incoming information units to be written into contiguous memory segments. The incoming information units form at least one queue and the pointers form a linked list of pointers if the information units are written into more than one contiguous memory segment.

The foregoing has outlined rather broadly the features and technical advantages of embodiments of the present invention in order that the detailed description of the invention that follows may be better understood. Additional features and advantages of embodiments of the invention will be described thereafter, which form the subject of the claims of the invention. It should be appreciated by those skilled in the art that the conception and specific embodiments disclosed may be readily utilized as a basis for modifying or designing other structures of processes for carrying out the same purpose of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1a is a simplified block diagram for a system of data processing;

FIG. 1b is a simplified block diagram for a memory control logic and a storage unit;

DETAILED DESCRIPTION OF ILLUSTRATIVE EMBODIMENTS

Figure 2A:
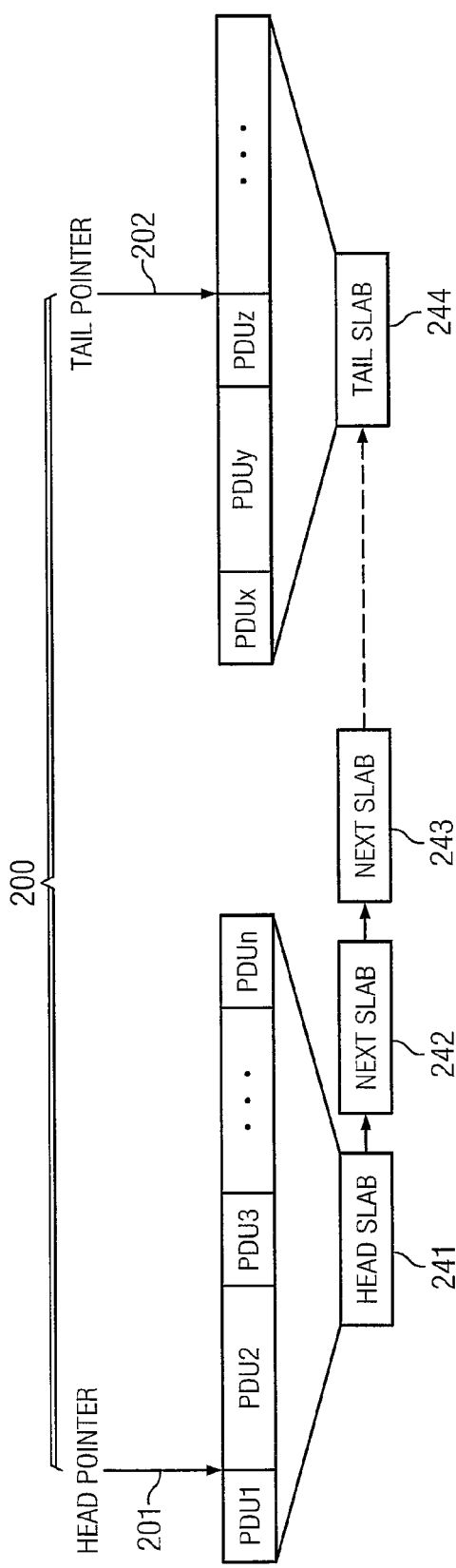
FIG. 2a shows a slab allocation to a queue at a particular time.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely the area of network processors. The invention may also be applied, however, to other data processing applications.

In information networks digital information is transmitted using information units such as cells or packets. The individual information units are transmitted from a source node to a destination node via connections, such as digital communication lines and network devices.

FIG. 1a shows a simplified block diagram of a system for data processing 100. The system 100 may include an input data processing entity 110, a central data processing entity 120 and an output data processing entity 130. The system 100 may further include memory control logic 140 and a storage unit 150. In one embodiment all entities are placed on one semiconductor structure, i.e., on a single chip. In other embodiments only some of the entities are placed on one structure or chip and others are placed on separate structure(s) or chip(s). For example, the storage unit 150 may be an external memory device placed on a separate chip or may be a plurality of external memory devices, all of them placed on separate chips.

The input data processing entity 110 is connected to the memory control logic 140 and to the network 160. The input data processing entity 110 is configured to receive data from the network 160. The input data processing entity 110 is further configured to parse, classify and queue the received data. The input data processing entity 110 may comprise a local storage unit 111, e.g., a buffer.

The memory control logic 140 is connected to the input data processing entity 110, the central data processing entity 120, the output data processing entity 130, and the storage unit 150. The memory control logic 140 receives data from the input data processing entity 110 and sends data to the output data processing entity 130. It receives and sends data to the central data processing entity 120 and the storage unit 150. The memory control logic 140 manages the storage of the data and forwards data requested by the central data processor 120.

The central data processing entity 120 is connected to the memory control logic 140. The central data processing entity 120 is configured to process, edit and forward data. The central data processing entity 120 may include a local storage unit 121, e.g., a local buffer.

The output data processing entity 130 is connected to the memory control logic 140 and the network 160. The output data processing entity 130 is configured to send data. The output data processing entity is further configured to schedule and rate shape the data. The output data processing entity 130 may comprise a local storage unit 131, e.g., a buffer. The transmission of outgoing information units is shaped and limited by traffic management and processed by the output data processing entity 130.

The storage unit 150 is connected the memory control logic 140. The storage unit 150 may provide large storage capacity such as 2 GB, for example. The storage unit 150 is typically subdivided into segments and the segments typically comprise 64 or 128 bytes but may be of any size. The storage unit 150 is organized into slabs, whereby a slab is a contiguous string of segments, for example. A typical slab may have a fixed size, such as 256 segments. However, any size may be possible. Slabs rather than segments are the minimum granularity with which the memory control logic 140 operates.

In another embodiment, when the storage unit 150 is not a single memory device but a number of memory devices the memory control logic 140 may balance the load across interfaces of the memory devices. For example, assuming four memory devices together form the storage unit 150, and assuming a slab comprises 256 segments, logical addressing of the segments can be chosen in such a way that the slab is laid out on all the 4 memory devices occupying (physical addresses 0 to 63 on each of the devices). The physical addresses 0 to 63 on the four interfaces correspond to the logical segment addresses 0 to 255 all on that slab.

Referring now to FIG. 1b, a simplified block diagram of a memory control logic 140 is shown. The memory control logic 140 is connected to the storage unit 150. The memory control logic 140 includes a slab manager 141 and local memories such as a queue pointer memory 142 and a slab pointer memory 143. The queue pointer memory 142 may comprise queue head and queue tail pointers that address segments in the storage unit 150. The queue pointer memory or pointer table memory 142 may include a head pointer and a tail pointer for each queue. The queue tail pointer may indicate the address at which the next information unit can be written to and the queue head pointer may indicates the address from which the next information unit can be read from.

In an embodiment of the invention a linked slab structure is used in order to store information units in the storage unit 150. The free and occupied slab pointers relate to free and occupied slabs in the external storage unit 150. The list of free and occupied pointers is a linked list, e.g., occupied slab pointers are linked to other occupied slab pointers and free slab pointers are linked to other free slab pointers. The slab pointer memory 143 may store many free and occupied linked lists.

A substantial advantage of an embodiment of the present invention is that the list of occupied and free slab pointers consumes much less memory space than in conventional approaches. Other advantages are also evident. For example, each queue has sufficient and dynamic memory space on the storage unit 150. There is no upfront reservation of space for each queue. Queues may be able to grow and shrink dynamically and other queues can take advantage of available unused memory space. Further, locality of information units in a queue is exploited. A consecutive set of information units, forming a slab, are stored in logically contiguous memory addresses. The slab wise organization of the information units may reduce the number of pointers required to address each individual information unit. This in turn, reduces the size of the slab pointer memory 143. As a consequence of reducing the number of pointers and storing them on-chip the problem of pointer corruption leading to memory leakage is greatly mitigated In an embodiment, particularly where the size of the slabs are fixed, the size of the slab pointer memory 143 of this list of occupied and free slabs is given by the total number of segments in the storage unit 150 divided by the number of segments per slab. If the slab granularity is increased, i.e., if the number of segments per slab is increased, the size of the local memory is decreased.

Network traffic pattern is bursty in nature. There are times where many information units arrive at the input data processing entity 110 and there are other times where no or only a few information units arrive at that entity. According to its specification and design capabilities, the input data processing entity 110 must be able to receive and handle large quantities of information units at once. Within its specification, the data processing unit 110 may not lose any unit even under extreme circumstance. Deviation from the specification is not acceptable. The input data processing entity 110 processes these units by parsing, classifying and queuing the received information units. Similarly, the output data processing entity 130 may schedule and rate shape the accessed information units before it releases them into the network.

Different traffic pattern reflect different queuing applications resulting in a wide variation of queue lengths. In one embodiment, queues may be able to grow and shrink dynamically by adding information units at the tail end and processing information units from the front end (first-in, first-out, FIFO). The memory control logic 140 may manage several queues in parallel. Quality of service (QoS) may determine to which queue incoming information units are allocated. Since the arrangement of queues depends on the traffic pattern of the network the queues are typically larger when traffic is busy and smaller when traffic is slow.

It is desirable to allocate slabs to these queues to accommodate their memory requirements optimally and efficiently.

Each queue has memory space in the storage unit 150 allocated to it. There is no upfront reservation of memory space for a queue in the storage unit 150 so queues can take advantage of available unused memory space. If there are no information units stored in a queue, the queue length is zero and there are no slabs allocated to this queue. The respective queue head and tail pointers point to the same location in the storage unit 150.

The input data processing entity 110 may process incoming information units by grouping them into queues and writing them as soon as possible via the memory control logic 140 to the storage unit 150. Since the storage unit 150 is an external storage device in a particular embodiment, there is no need for a large on-chip buffer to store any of the information units.

Queues are built and accessed using head and tail pointers that address segments in the storage unit 150. Slabs are allocated from a free pool of slab pointers by the memory control logic 140 for each queue on demand. Similarly, slabs belonging to an occupied queue are returned to a free pool of slab pointers by the memory controlling logic 140 after all the PDUs of a slab are completely read out and processed.

The slab manager 141 may allocate a free slab to a queue which at this point in time, may not store any information units. After the first slab for this queue is allocated, the queue tail pointer is updated with the address of the newly allocated slab. At the same time, the head pointer of the queue is also updated with same value as the tail pointer. The queue tail pointer advances towards the end of the first slab as more and more information units arrive into the queue. As succeeding information units are written into the queue, the tail pointer reaches the end of that slab. At this time, a new slab or second slab is requested for accommodating the new information units. The second slab is linked to the first slab. This process is repeated. Now that the queue is spread across multiple slabs, the new slab is entered into the linked list for that particular queue.

The head pointer follows the tail pointer and tries to catch up with the tail pointer as and when the information units are read out and processed by the memory control logic 140. While moving towards the tail pointer, the head pointer encounters the end of the first slab. For reading the next information unit from the queue the head pointer has to jump over to a second slab. The information regarding where the next information unit for the queue can be found in the linked list. By reading the queue pointer table memory 142, the slab manager 141 is able to provide the address of the second slab. After the head pointer jumps over from the first slab to the second slab, the first slab is removed from the occupied list of slabs. At this stage, the first slab is returned to the free list of slab pointers so that it is available if some other queue requests a free slab.

The slab manager 141 continuously allocates and de-allocates slabs to the queues. Since this process is a dynamic process the size of a given queue is usually continuously changing. Typically, at any point in time, the queue varies in length and so does the corresponding linked list. Depending upon the relative speed of growing and shrinking, the queue has a respective length. The queue may grow at the tail end and simultaneously may keep shrinking from the head end. If the memory control logic 140 stops adding information units to the queue, the queue will eventually become empty and the head pointer moves towards and meets the tail pointer. The length can be 0 when no information unit is written into a queue or when all the information units stored are completely read out. Therefore, no slab may be allocated to this queue. If the memory control logic 140 adds more information units to the tail end of the queue than it processes from the head end, the queue length increases continuously.

The memory control logic 140, in particular the slab manager 141, allocates free slab pointers to queues forming a linked list (after allocation, the slab pointers are no longer free but occupied) and de-allocates the slab pointers from the queues when no longer needed (after de-allocation, the slab pointers are no longer occupied but free). Allocating free slabs to the list of occupied slabs and de-allocating occupied slabs to the free list of slabs is a continuous process accompanying the adding of information units to the queue and processing information units from the queue. In one embodiment, the slab manager 141 may only allocate a slab to the occupied list of slabs during or just before a first data packet of an information unit is written into that slab. Similarly, the slab manger 141 may only de-allocate a slab from the occupied list of slabs when the last data of an information unit is processed from that slab.

FIG. 2a illustrates a static moment of a queue 200 in the queue's dynamic process. At a time t, the slabs 241-244 belong to queue 200. The head pointer 201 points to the information unit PDU2 in the slab 241. The information units PDU2-PDUn fill the slab 241. Succeeding information units PDUs fill the next slabs 242-244. The tail pointer 202 of the queue 200 points to the last information unit PDUz. At a time t+1 the memory control logic 140 may have read out information unit PDU2. Information unit PDU2 would not be stored in the slab 241 and the head pointer would point to the information unit PDU3. Similarly, the memory control logic 140 may have added an additional information unit (not shown) at the end of the queue 200. The tail pointer 202 would then point to the additional information unit.

The additional information unit (not shown) may be stored in the slab 244 if there is space still available for an additional information unit within that slab 244. However, if the there is not enough memory space available in slab 244 the additional information unit may be stored in an additional slab (not shown).

Figure 2B:
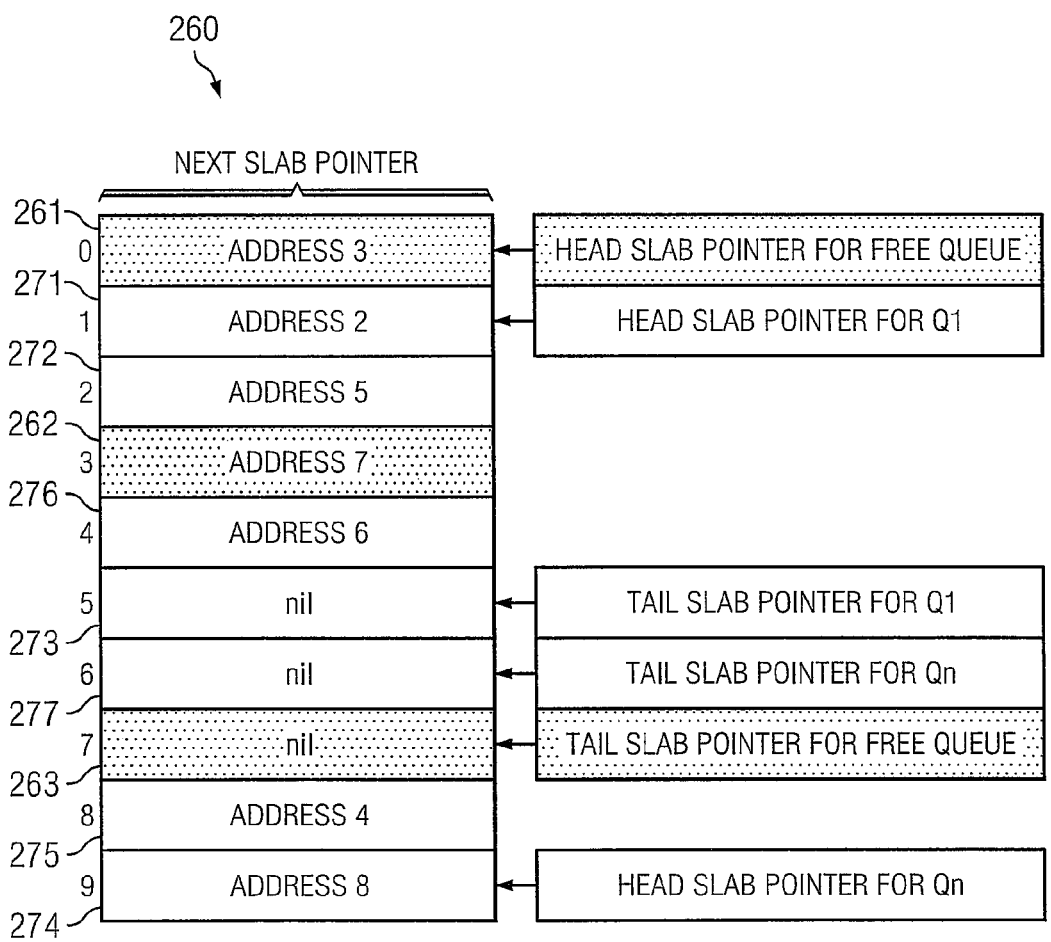
FIG. 2b shows an embodiment of a linked list of slab pointers.

FIG. 2b illustrates an occupied and free list of slab pointers 260 stored in the queue pointer table memory 142 at a specific moment in time. The occupied and free list of slab pointers 260 provides the slab manager 141 with a linked list of slab pointers and with information at which address the slabs are located in the memory. As can be seen from FIG. 2b slab pointers 261-263 refer to free slabs, slab pointers 271-273 refer to slabs in queue Q1 and slab pointers 274-277 refer to slabs in queue Qn. As discussed above, the head slab pointer 271 of queue Q1 is moved from the pool of occupied slab pointers to the pool of free slab pointers when the last information unit PDU in this slab is read out. When the head slab pointer 271 is returned to the pool of free slab pointers it is available for any queue on demand. In contrast, if a free slab is added to queue Q1, the respective slab pointer, for example pointer 261, is added to the linked list of slab pointers of queue Q1 as the new tail of this queue.

In an embodiment the free queue is just another linked list. Even here, free slabs may be removed from the head and free slabs may be added to the tail. Slabs freed up from the head of occupied queues are added to the tail of the free list. Similarly, free slabs taken from the head of the free list may be added to the tail of a particular queue that requested this free slab.

Figure 3:
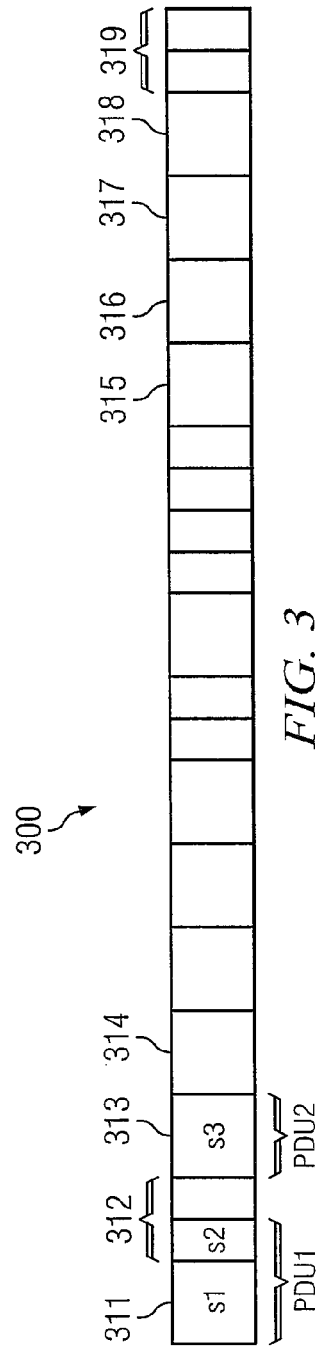
FIG. 3 shows an allocation of information units into segments of a slab.

FIG. 3 shows a contiguous string of segments 311-319 in the storage unit 150 forming a slab 300. FIG. 3 illustrates how information units are placed in segments 311-319 of a slab 300. In this example, the header segments of each information unit or packet stores 'meta data' that is applicable over the entire packet spread over one or more segments. This meta data contains the information such as the queue number of this information unit, the length of the information unit, and the quality of service about the information unit. Other information may be stored too. Assuming a segment size of 128 bytes with a meta data size of 48 bytes and assuming a size of the first information unit PDU1 of a queue is 81 byte, then the first 80 bytes will be written into the first segment 311 and the remaining 1 byte will be written into the second segment 312. The next information unit PDU2 of the queue is placed in the third segment 313 and so on leaving some unused memory space in the second segment 312.

Figure 4:
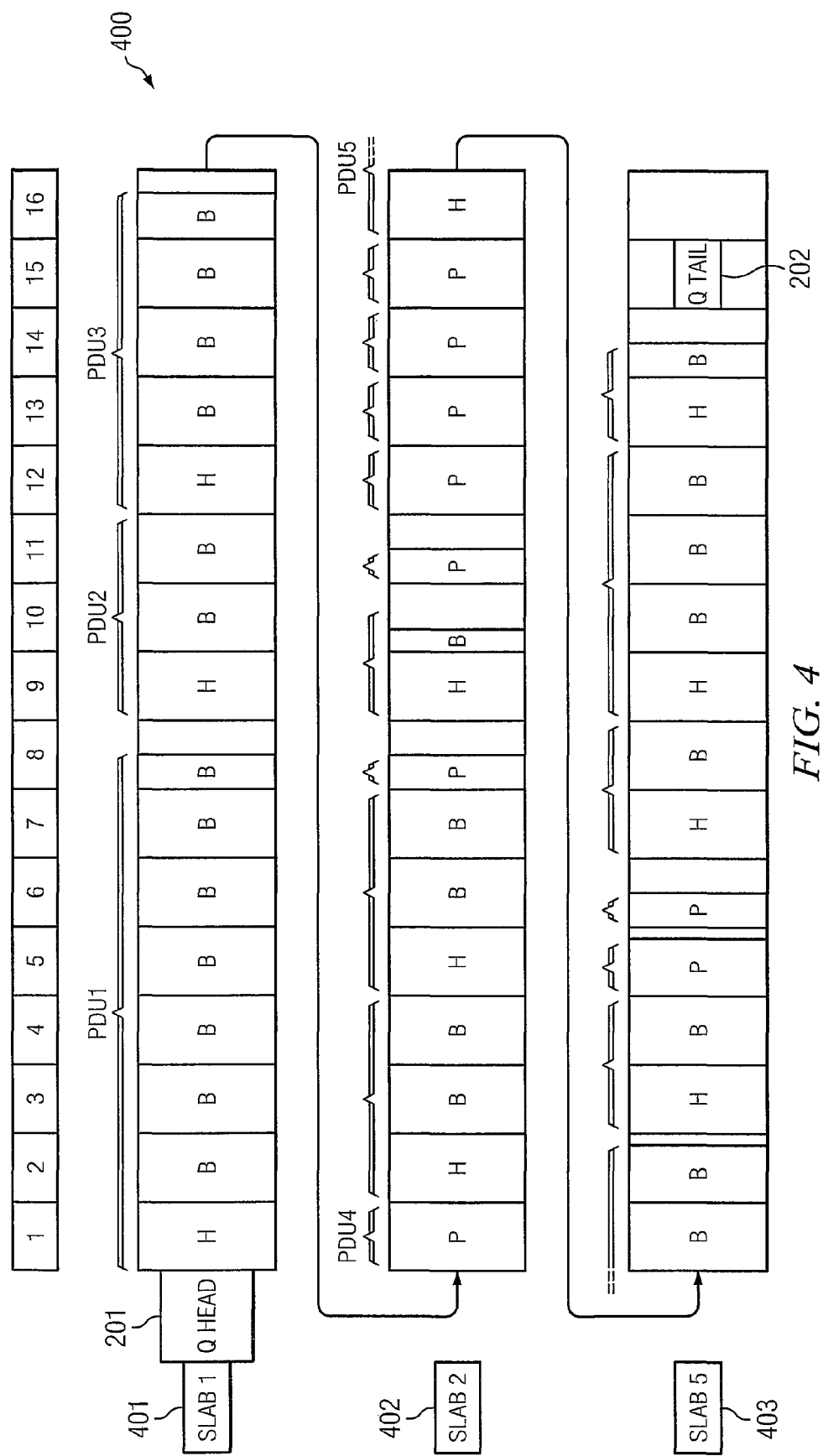
FIG. 4 illustrates an embodiment of a linked list of slabs.

FIG. 4 illustrates a first embodiment of the present invention. Again, as the length of a queue and the respective linked list of slabs are continuously changing, FIG. 4 shows a queue and a linked list of slabs at a specific time. The exemplary linked list of slabs 400 includes three slabs (slab one 401, slab two 402 and slab five 403). Each slab 401-403 comprises a contiguous string of 16 segments. The linked list of slabs 400 is allocated to a queue defined by its queue head 201 and queue tail 202. Information units PDUs of different lengths are put into the slabs 401-403. The queue is built by taking a free slab and writing the complete information units PDUs into this slab. Further, more slabs are added into this list as more information units PDUs arrive. On the other hand, the information units PDUs may be read out in the same order as they were written in. As more and more information units are read out for processing, slabs become free and will be returned to the pool of free slabs in order to be used by any queue requesting a free queue. The information units PDUs typically have a head segment H and at least one body segment B. In some examples, however, a complete information unit is stored in the head segment P.

As can be seen from FIG. 4, the first information unit PDU1 does not fit perfectly into the first 8 segments of the first slab 401 and leaves some memory space unused. The second information unit PDU2 begins with segment 9 and fits perfectly into the next 3 segments. The third information unit PDU3 begins with segment 12 and also does not fit perfectly into the segments wasting some memory space. The fourth information unit PDU4 is exactly one segment long and does therefore fit perfectly into a segment. The memory control logic 140 continues to write information units PDUs into the slabs until there are no information units to be added at a time. The tail pointer is advanced after writing a new information unit PDU. In this embodiment, all parts of a complete information unit PDU reside in logically contiguous addresses.

This embodiment may be best suited for applications where information units may be processed as a complete packet as one unit. In applications where header segments alone are processed in one round and the body segments are processed later, other embodiments described later in this application are preferred. This embodiment is best suited for applications where the information units stay in a single queue, in other words where information units do not switch queues.

Figure 5A:
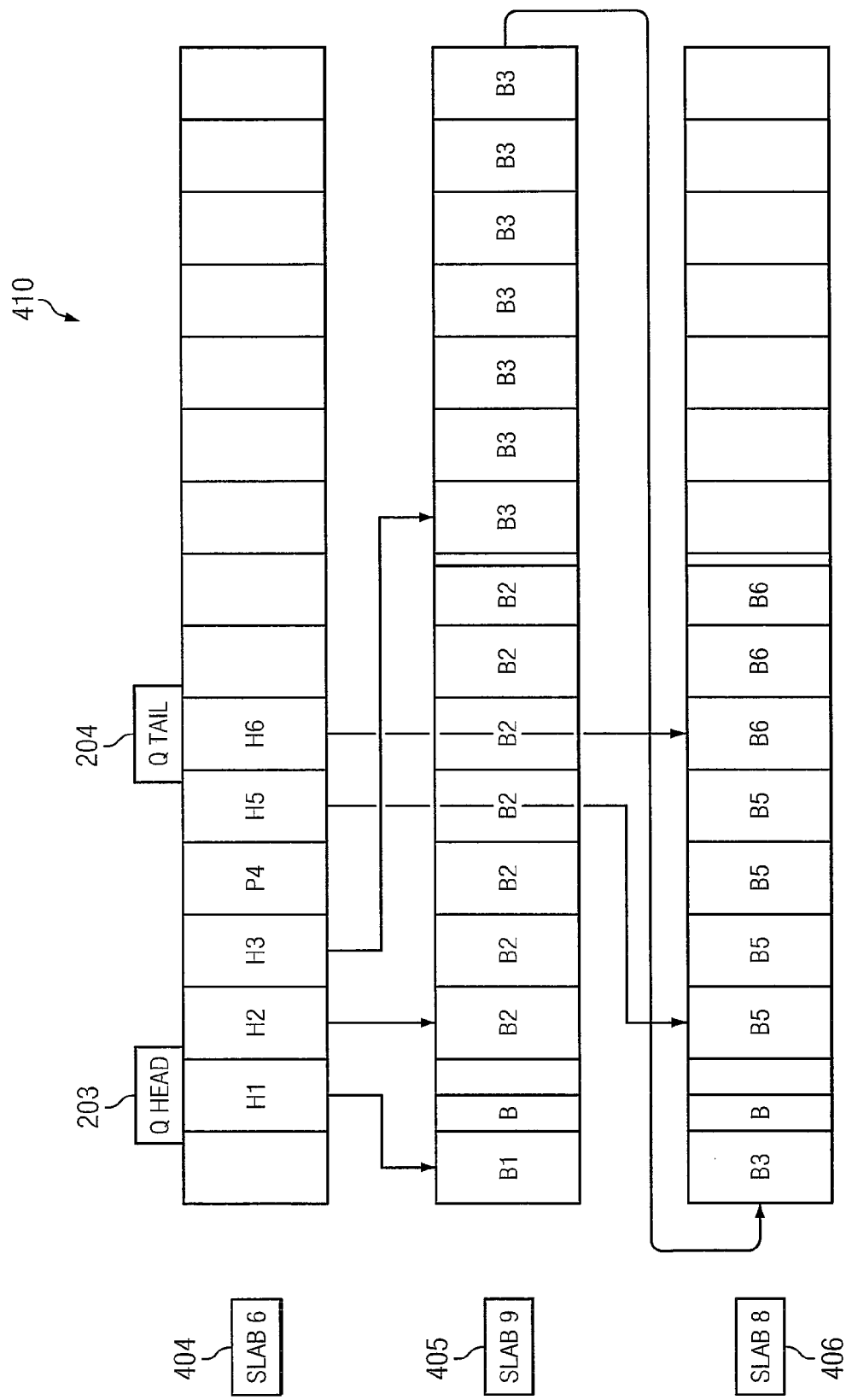
FIG. 5a illustrates another embodiment of a linked list of slabs.

FIG. 5a shows a second embodiment of the present invention. An exemplary linked list of slabs 410 is shown wherein the linked list of slabs 410 include slab six 404, slab nine 405 and slab eight 406. Each slab 404-406 comprises a contiguous string of 16 segments. The linked list of slabs 410 is allocated to a queue defined by its queue head 203 and queue tail 204. Information units PDUs of different lengths are put into the slabs 404-406. In this embodiment, the head H and the bodies B are stored in different slabs. The heads H of the information units are stored in a head slab 404 and the bodies B of the information units are stored in body slabs 405, 406. The heads H are linked to their bodies B via a pointer. Information units, which comprise all information in one segment P, are stored in the head slab 404. H may be one segment long but bodies may be several segments long or just a fraction of a segment long leading to some unoccupied memory space.

This embodiment may be suited for applications where information units switch from one queue to another. The header H of an information unit can be moved to another queue and the pointer still points to its original body B in its "old" body slab 405, 406.

Figure 5B:
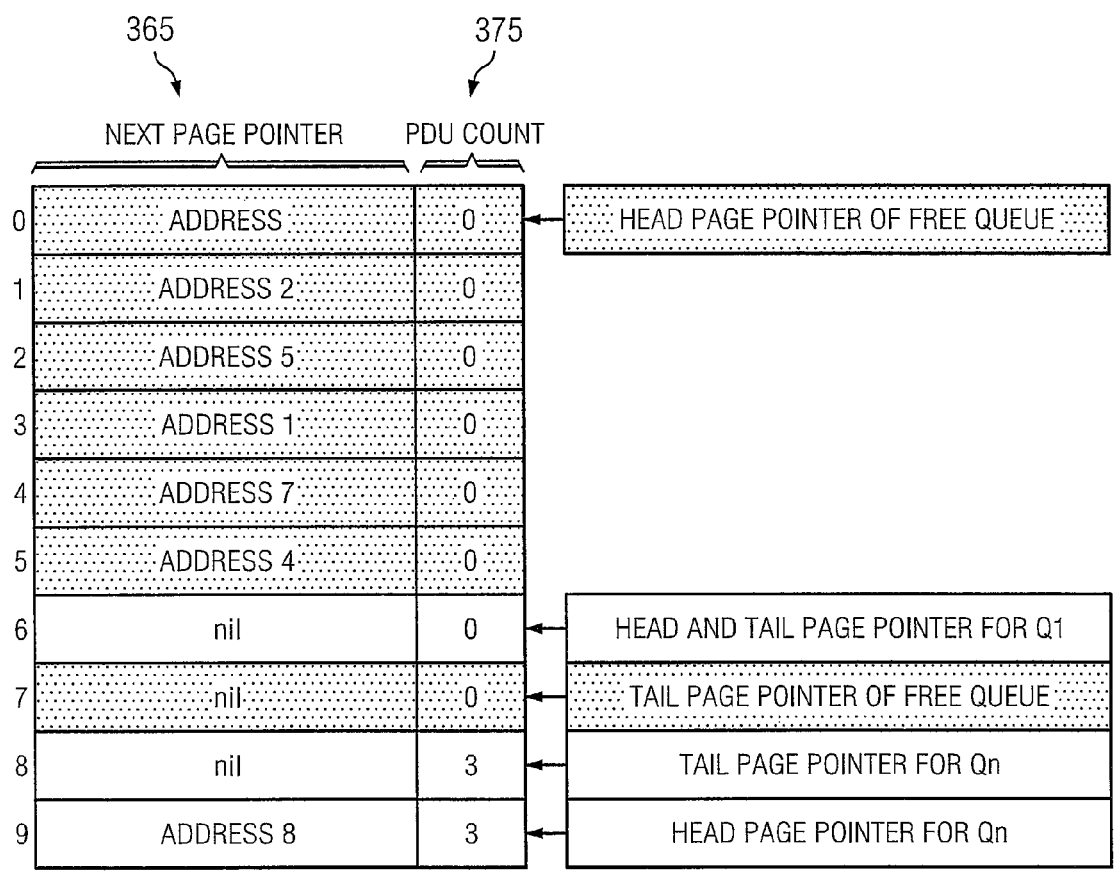
FIG. 5b shows the embodiment of a linked list of slab pointers.

In one particular example, the queue in the head slab 404 is a FIFO buffer. If an information unit switches queues the header is switched and the header is therefore the last header added to the head slab 404 of the new queue. The body/bodies, however, may not switch queues and may not be in FIFO order any longer in their body slab 405, 406. To read the bodies out of the order in the body slab 405, 406, an information unit count 375 may be attached to every body slab pointer 365 in the slab pointer memory 143 as can be seen from FIG. 5b. Whenever an information unit is read out of a body slab 405, 406, the information unit count 375 is decremented by one. When the count reaches '0', i.e., when there is no body in the body slab 405, 406 anymore, the slab pointer 365 together with the information unit count 375 is released to the free pool of slabs pointers. When the bodies of an information unit spread across multiple body slabs 405, 406, the information unit counts 375 of all respective slab pointers 365 are decremented by one when the information unit is accessed and the bodies are read out.

This embodiment is best suited for applications where the data rates across different queues may not vary widely, that is where queues may be enqueued or dequeued with similar speed. If the data rates vary widely, some body slabs 405, 406 are built and emptied fast, others in turn are built and emptied slowly. If the body slabs 405, 406 contain bodies from information units of fast queues and bodies from information units of slow queues, the bodies of the slow queues may remain in the body slabs 405, 406 for a long time preventing the body slabs 405, 406 to be released into the pool of free slabs. In extreme cases, this may lead to no available body slabs 404, 405 for queues since every slab is occupied by at least one body of a slow queue.

Figure 6:
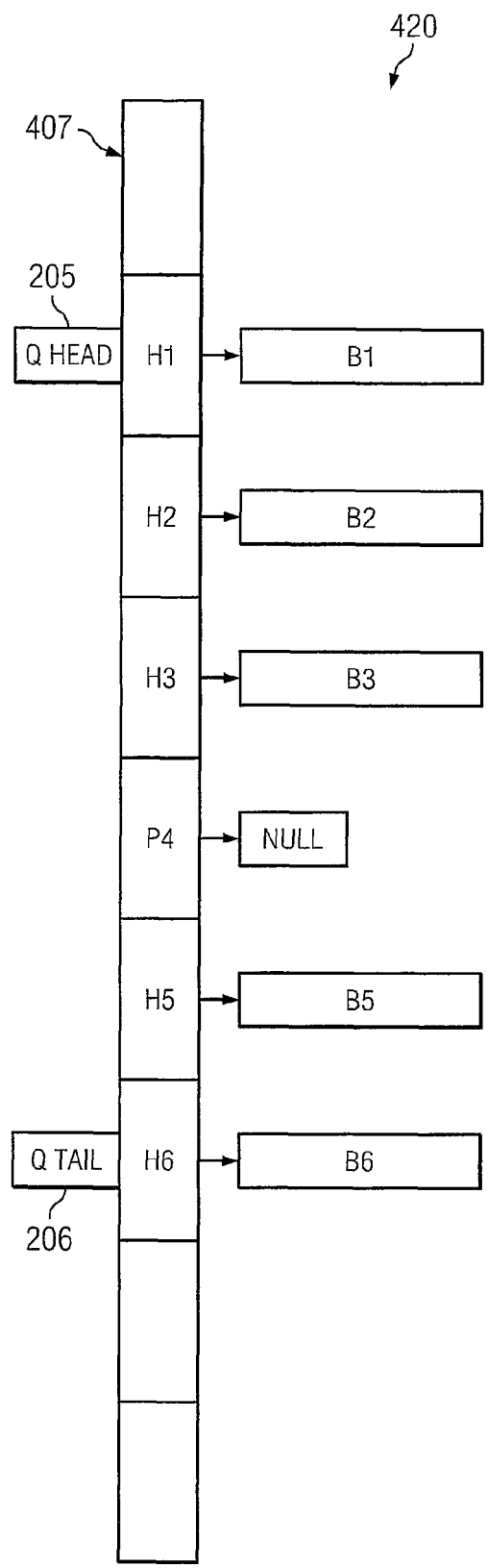
FIG. 6 illustrates a further embodiment of a linked list of slabs.

FIG. 6 shows a third embodiment of the present invention. A slab 420 may be assigned to a queue, marked by a queue head 205 and a queue tail 206. Slab 420 is a head slab 407 and headers H1-H6 of six different information units are stored therein. The headers H1-H6 may be connected to their respective bodies B1-B6 via pointers. In this embodiment, however, only the headers H1-H6 are in a linked slab structure while the bodies B1-B6 are stored in segments, i.e. not in a linked slab structure. In this embodiment, the preferable segment size for the bodies B1-B6 may be the same as the size of the maximum information unit, for example.

In this application, the memory control logic may allocate memory space in two different sizes, e.g., headers may be stored in slabs and bodies may be stored in segments. Since the number of body segments is very large, it is not possible to store the list of body segments into the slab pointer memory 143 or any other local memory of the memory control logic 140. In this scenario, when the free pointers are stored in an external memory, caching the free body pointers may be used to quickly queue up the incoming packets.

Figure 7:
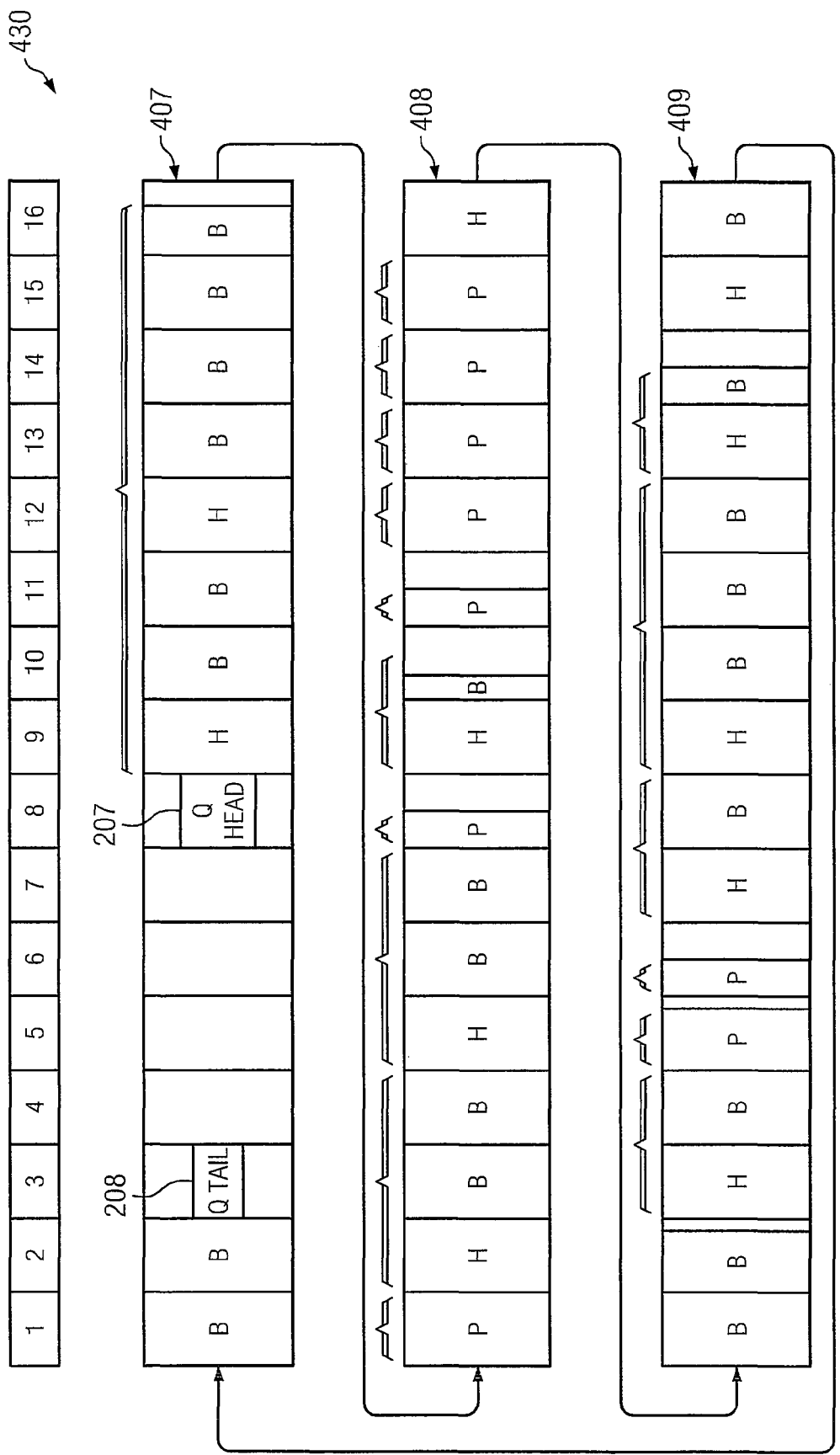
FIG. 7 illustrates yet another embodiment of a linked list of slabs.

FIG. 7 shows a fourth embodiment of the present invention. The fourth embodiment is directed to optimize the memory space in the storage unit 150. Under extreme conditions, it may be possible that there are no free slabs available to be assigned to a queue and to store the incoming information units. Under such circumstances the incoming information units would be dropped. With the present embodiment, a circular linked list of slabs 430 is provided wherein the first slab 407 is linked to second slab 408, the second slab 408 is linked to the third slab 409 and the third slab is linked to the first slab 407, for example. In this embodiment, the incoming information units can be stored even though there are technically no free slabs available. The incoming information units may be stored into a linked list of occupied slabs 430 and if there is unused memory space available until the queue tail 208 falls just short of meeting the queue head 207. A circular linked list of slabs 430 may be available for all linked list of slab applications such as storing the head and body segments continuously or storing the header in a head slab and the body segments in the body slab, for example.

In a further embodiment of the invention, the size of the slabs is variable in order to optimize available memory space in the storage unit 150. A uniform sized slab allocation policy may result in starvation for memory space for some traffic pattern and wastage of memory space for others. For example, if a traffic pattern is bursty, slabs fill up quickly and larger sized slabs would provide an advantage. In contrast, if the traffic pattern is steady, shorter slabs may be useful. Slabs may comprise a size which is a multiple of 128 segments, such as 128 segments, 256 segments, 384 segments, etc. However, any segment size may be suitable.

Figure 8:
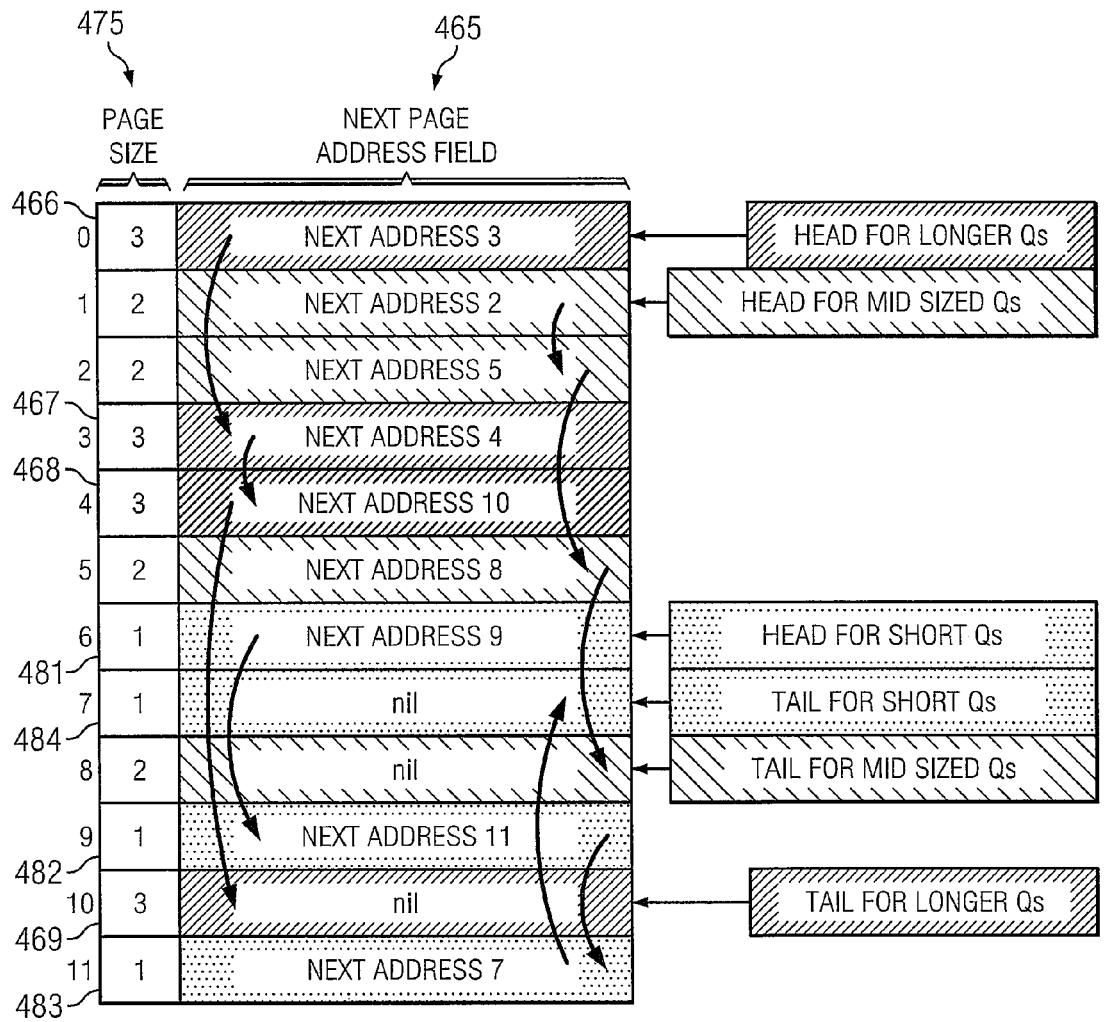
FIG. 8 shows a further embodiment of a linked list of slab pointers.

Slabs and their corresponding slab pointers can be grouped into multiple groups. As can be seen from FIG. 8, there are three different groups: Slabs for longer queues, slabs for mid sized queues and slabs for short queues. The slabs for longer queues are bigger than the slabs for mid sized queues and the slabs for mid sized queues are bigger than the slabs for the short queues. For example, the long slabs may comprise 384 segments while the mid sized slabs may comprise 256 segments and the short slabs may comprise 128 segments. Therefore, the queues get their slabs from their grouping. However, the slab manager 141 may allocate slabs from a different group to the queues if needed, for example, a slab for short queues to a long queue.

To identify to which group of slabs the slab pointers belong, a slab size indicator 475 may be attached to each slab pointer of the linked list 465. As can also be seen from FIG. 8, the slab pointers of the longer queues 466-469 form a linked list. For slabs in the group for longer queues, the head pointer 466 is linked to a slab pointer 467 which in turn is linked to a slab pointer 468 which again is linked to a slab tail pointer 469. The slabs or the other groups are linked similarly. For example, for slabs in the group for shorter queues, the head slab pointer 481 is linked to slab pointers 482, 483 and finally to slab tail pointer 484.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network processor comprising:
    a first local storage unit configured to store a plurality of slab pointers, wherein each slab pointer is either a free slab pointer or an occupied slab pointer;
    a second local storage unit configured to store a plurality of queue head pointers and a plurality of queue tail pointers, wherein one head pointer and one tail pointer belong to one queue;
    a memory storage unit configured to store information units, wherein the memory storage unit comprises a plurality of slabs and wherein each slab corresponds to one slab pointer; and
    a memory control logic configured to allocate at least one of the free slab pointers to a queue, if the memory control logic causes the information units to be written into the queue,
    wherein the free slab pointer becomes an occupied slab pointer after allocation to the queue.

2. The network processor according to claim 1, wherein a first plurality of slab pointers form a first linked list of slab pointers when the respective first plurality of slabs are allocated to a first queue.

3. The network processor according to claim 1, wherein the slabs are divided into head slabs and body slabs and wherein head segments of the information units are stored in the head slab and body segments of the information units are stored in the body slabs.

4. The network processor according to claim 1, wherein the storage unit further comprises a plurality of segments and wherein head segments of the information units are stored in the slab and body segments of the information units are stored in the segment.

5. The network processor according to claim 1, wherein the memory storage unit comprises a plurality of external storage devices.

6. A system for storing information units, the system comprising:
    a memory comprising a plurality of contiguous memory segments and a plurality of external storage devices, wherein the plurality of contiguous memory segments comprises different sizes;
    a local memory configured to store a plurality of pointers, each pointer pointing to one contiguous memory segment;
    a receiving unit configured to arrange incoming information units into queues; and
    memory control logic configured to allocate pointers to the queues and configured to cause the incoming information units to be written into contiguous memory segments,
    wherein the incoming information units form at least one queue and wherein the pointers form a linked list of pointers if the information units are written into more than one contiguous memory segment,
    wherein pointers of larger contiguous memory segments are allocated to long queues and pointers of shorter contiguous memory segments are allocated to short queues, and
    wherein the pointers, after the information units have been written into the associated contiguous memory segments, are moved from a free list of pointers to an occupied list of pointers.

* * * * *